June 13, 1961
L. M. MANNA
2,988,381
BICYCLE KICKSTAND
Filed Sept. 17, 1958
Fig. 2.
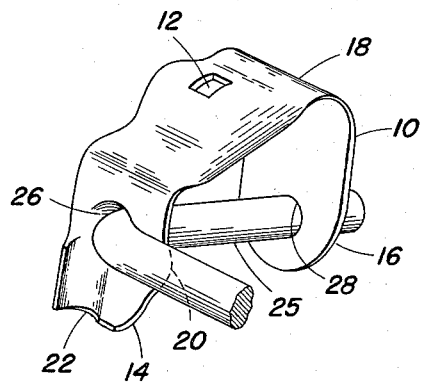
Fig. 1.
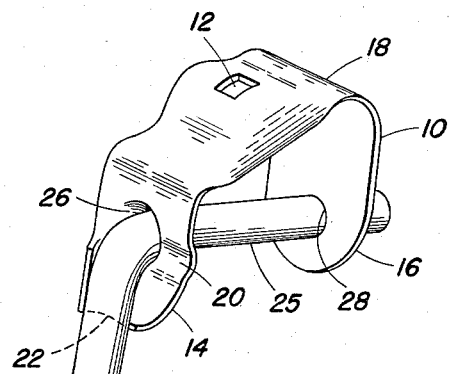
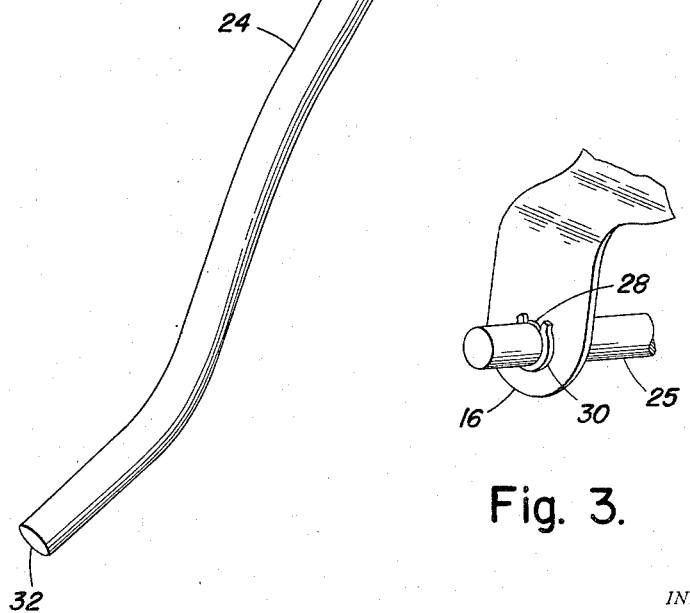
Fig. 3.
INVENTOR.
Lee M. Manna
BY
ATTORNEY

United States Patent Office 2,988,381
Patented June 13, 1961

2,988,381
BICYCLE KICKSTAND
Lee M. Manna, Morton Grove, Ill., assignor to American Machine & Foundry Company, a corporation of New Jersey
Filed Sept. 17, 1958, Ser. No. 761,503
1 Claim. (Cl. 280—301)

This invention relates to an improved bicycle kickstand.

Kickstands formerly designed had a number of parts such as a spring, washer, bracket and cotter pins or other locking parts in order to cause an outward force against the kickstand rod so that it would be held in position when in extended or when it is retracted in inoperative position.

It is an object of this invention to provide a bicycle kickstand which is of still simpler design and which would be inexpensive to manufacture and which may be easily moved from an extended operative position to the withdrawn inoperative position.

Another object of this invention is to provide a kickstand which is free from rattles when the kickstand rod is in the withdrawn inoperative position.

A further object of this invention is to provide a simplified bicycle kickstand which has a lesser number of parts than other kickstands which also is a contributing factor in reducing the cost of manufacture.

Other objects and features of the invention will appear as the description of the particular physical embodiment selected to illustrate the invention progresses. In the accompanying drawings, which form a part of this specification, like characters of reference have been applied to the corresponding parts throughout the several views which make up the drawings.

FIGURE 1 is a perspective view of the bicycle kickstand.

FIGURE 2 is a partial view showing the supporting rod in a raised position.

FIGURE 3 shows the cotterpin on the supporting rod.

Referring to FIGURE 1, the assembled kickstand consists of a bracket-spring 10, having a hole 12 by which the kickstand is attached to the bicycle frame (not shown). The bracket-spring serves as a bracket and also as a spring. It has the form of a skewed channel with legs 14 and 16 extending outwardly from a skewed body 18. One of the extending legs 14 has U-shaped indentations 20 and 22. The legs 14 and 16 of the bracket 10 are spring tensioned outwardly so that they exert a spring gripping action on the L-shaped rod 24 when leg 25 of the rod 24 is inserted through the holes 26 and 28 and held in place by a conventional cotterpin 30 or a flat spring clip which snaps into a groove formed at the end of the rod 24.

When the bicycle kickstand is in the extended position the rod is held firmly in the U-shaped ridge 22 by the rod-fastener compressing spring tensioned legs 14 and 16 together. In this position the bicycle (not shown) is resting on its two wheels and also on tip 32 of rod 24. In order for the bicycle to be used the operator elevates the rod 24 and snaps it into the U-shaped indentation 20.

The rod fastener 30 which secures the kickstand rod to the bracket-spring maintains a spring tension load on the two extending ears 14 and 16 against the rod 24 which is now held firmly in the U-shaped indentation 20 in a withdrawn inoperative position. This preload for the withdrawn inoperative position of the kickstand eliminates rattling when the bicycle is in motion. By this arrangement it is no longer necessary to employ separate springs for tensioning the kickstand rod and as a consequence the number of parts have been reduced which results in a more serviceable and more economical kickstand.

The invention hereinabove described may therefore be varied in construction within the scope of the claim, for the particular device selected to illustrate the invention is but one of many possible embodiments of the same. The invention, therefore, is not to be restricted to the precise details of the structure shown and described.

What is claimed is:

A bicycle kickstand comprising a U-shaped bracket, one leg of said U-shaped bracket having indentations on its outer face, an L-shaped bicycle supporting rod having one leg extending through the legs of said U-shaped bracket and the other leg resting in an indentation of said U-shaped bracket and means attached to the end of the leg which extends through said U-shaped bracket and assembled so that the legs of said U-shaped bracket are under compression to cause a holding action when the L-shaped rod is rotated and snapped into any of the indentations of said U-shaped bracket.

References Cited in the file of this patent

UNITED STATES PATENTS

| | | |
|---|---|---|
| 546,612 | Getty | Sept. 17, 1895 |
| 1,817,568 | Knoth | Aug. 4, 1931 |
| 2,595,193 | Haug | Apr. 29, 1952 |
| 2,866,654 | Duffy | Dec. 30, 1958 |